United States Patent
Yapici et al.

(10) Patent No.: US 12,439,255 B2
(45) Date of Patent: Oct. 7, 2025

(54) NETWORK RESPONSE AGAINST MALICIOUS NODES

(71) Applicant: QUALCOMM Incorporated, San Diego, CA (US)

(72) Inventors: Yavuz Yapici, Florham Park, NJ (US); Igor Gutman, Hod HaSharon (IL); Junyi Li, Fairless Hills, PA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 360 days.

(21) Appl. No.: 17/812,162

(22) Filed: Jul. 12, 2022

(65) Prior Publication Data
US 2024/0022909 A1    Jan. 18, 2024

(51) Int. Cl.
*H04W 12/08* (2021.01)
*H04L 9/40* (2022.01)
*H04W 12/12* (2021.01)

(52) U.S. Cl.
CPC .......... *H04W 12/08* (2013.01); *H04L 63/162* (2013.01); *H04W 12/12* (2013.01)

(58) Field of Classification Search
CPC ... H04W 12/06; H04W 12/72; H04W 12/122; H04W 12/08; H04W 12/12; H04W 48/02; H04W 48/16; H04W 12/71; H04W 12/37; H04W 12/03; H04W 12/121; H04W 12/00; H04W 12/062; H04L 63/1441; H04L 67/125
See application file for complete search history.

(56) References Cited

U.S. PATENT DOCUMENTS

| | | | |
|---|---|---|---|
| 8,773,990 B1* | 7/2014 | Rasool | H04W 12/122 370/235 |
| 9,380,462 B1* | 6/2016 | Vivanco | H04W 12/122 |
| 2011/0314542 A1* | 12/2011 | Viswanathan | G06F 21/554 726/23 |

(Continued)

FOREIGN PATENT DOCUMENTS

EP    3491864    6/2019

OTHER PUBLICATIONS

International Search Report and Written Opinion dated Oct. 2, 2023 from corresponding PCT Application No. PCT/US2023/069465.
(Continued)

*Primary Examiner* — Olumide Ajibade Akonai
(74) *Attorney, Agent, or Firm* — Arent Fox, LLP

(57) ABSTRACT

Aspects of an apparatus for wireless communication are disclosed for collaboratively assisting a network entity to manage security at the physical (PHY) layer. A user equipment (UE) may transmit a report indicating an unauthorized network node and associated information. In response, the UE may receive from the network entity a message indicating a security measure to be applied for communications between the UE and authorized network nodes. The message may be also received in response to another report from an authorized node that includes further information about the unauthorized node. In other aspects, the network entity may receive the report from the UE and transmit the message indicating the security measure.

30 Claims, 10 Drawing Sheets

(56) References Cited

U.S. PATENT DOCUMENTS

| | | | | |
|---|---|---|---|---|
| 2013/0269032 | A1* | 10/2013 | Chasko | H04L 63/1491 726/23 |
| 2020/0137580 | A1 | 4/2020 | Yang et al. | |
| 2021/0014689 | A1* | 1/2021 | Wang | H04W 76/30 |
| 2021/0153158 | A1 | 5/2021 | Agarwal et al. | |
| 2021/0352484 | A1* | 11/2021 | Pandit | H04W 12/122 |
| 2022/0007191 | A1* | 1/2022 | Shaw | H04W 28/09 |
| 2022/0322440 | A1* | 10/2022 | Munz | H04W 36/22 |

OTHER PUBLICATIONS

3rd Generation Partnership Project; Technical Specification Group Services and System Aspects Study on 5G Security Enhancement against False Base Stations (FBS) (Release 18), 3GPP Draft; S3-221266, 3rd Generation Partnership Project (3GPP), Mobile Competence Centre; 650, Route Des Lucioles; F-06921 Sophia-Antipolis Cedex; France Jun. 3, 2022 (Jun. 3, 2022), XP052195592, Retrieved from the Internet: URL:https://ftp.3gpp.org/tsg_sa/WG3_Security/TSGS3_107e/Docs/S3-221266.zip S3-221266/S3-221266-TR33809-cl.docx [retrieved on Jun. 3, 2022].

Prajwol Kumar Nakarmi et al: Murat: Multi-RAT False Base Station Detector, arxiv.org, Cornell University Library, 201 Olin Library Cornell University Ithaca, NY 14853, Feb. 17, 2021 (Feb. 17, 2021), XP08188753.

3rd Generation Partnership Project; Technical Specification Group Services and System Aspects; Security architecture and procedures for 5G system (Release 17), 3GPP Draft; 33501-H60, 3rd Generation Project (3GPP), Mobile Competence Centre; 650, Route Des Lucioles; F-06921 Sophia-Antipolis Cedex; France No. 20220601 Jun. 17, 2022 (Jun. 17, 2022), XP052201780. Retrieved from the Internet: URL:https://ftp.3gpp.org/3guinternal/3GPP_ultimate_versions_to_be_transposed/sentToDpc/33501-60.zip 33501-h60.doc [retrieved on Jun. 17, 2022].

* cited by examiner

NETWORK RESPONSE AGAINST MALICIOUS NODES

BACKGROUND

Technical Field

The present disclosure generally relates to communication systems, and more particularly, to security in wireless networks.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Physical control channels (i.e., PDCCH, PUCCH) and reference signals (RSs) are key to performing many 5G NR functions including, for example, channel estimation, uplink/downlink (UL/DL) grants, positioning capabilities, and the like. However, physical control channels lack security protection at the physical layer (PHY). Instead, the entire security protection mechanisms of 5G NR generally takes place in the upper layers through cryptographic algorithms. As such, there currently exists no available procedure that enables a cellular network to manage its nodes collaboratively to detect a malicious node, or that specifies how the network or nodes should respond when such an adversary node is detected.

In various aspects of the present disclosure, a set of PHY procedures is disclosed that, among other features, enables network entities and UEs to detect malicious nodes in collaboration. The detection may occur by proactively or reactively employing one or more base stations (e.g., gNBs), user equipments (UEs) or other network entities to assess the presence of an adversary, or by gathering alert reports from different base stations or UEs. The alert reports include information concerning one or more already detected adversaries. In addition, these aspects enable the network entity to execute necessary PHY or cross-layer security protection techniques to return the security and reliability level of the network to a desired level.

The collaborative techniques disclosed herein provide significant advantages to bolstering security and reliability in 5G networks. Such security and reliability are also envisioned as key performance measures for upcoming 6G implementations and other successor implementations to 5G.

In an aspect of the disclosure, a method and an apparatus for wireless communications at a UE are provided. The apparatus includes a transceiver, a memory and at least one processor coupled to the memory and the transceiver. The at least one processor is configured to transmit, via the transceiver, a report indicating a presence of an unauthorized network node. The report may include information associated with the unauthorized network node. The at least one controller is further configured to receive, via the transceiver, a message indicating a security measure to be applied for communications between authorized network nodes including the UE. The message may be received in response to the report and in response to another report from one of the authorized network nodes. The another report may include further information associated with the unauthorized network node.

In another aspect of the disclosure, a method and an apparatus for wireless communications at a network entity are provided. The apparatus includes a transceiver, a memory and at least one processor coupled to the memory and the transceiver. The at least one processor is configured receive, via the transceiver, a plurality of reports each indicating a presence of an unauthorized network node and including information associated with the unauthorized network node. The plurality of reports are respectively from a plurality of authorized network nodes. The at least one processor is further configured to transmit, via the transceiver, a message indicating a security measure to be applied for communication between the authorized network nodes in response to the plurality of reports.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
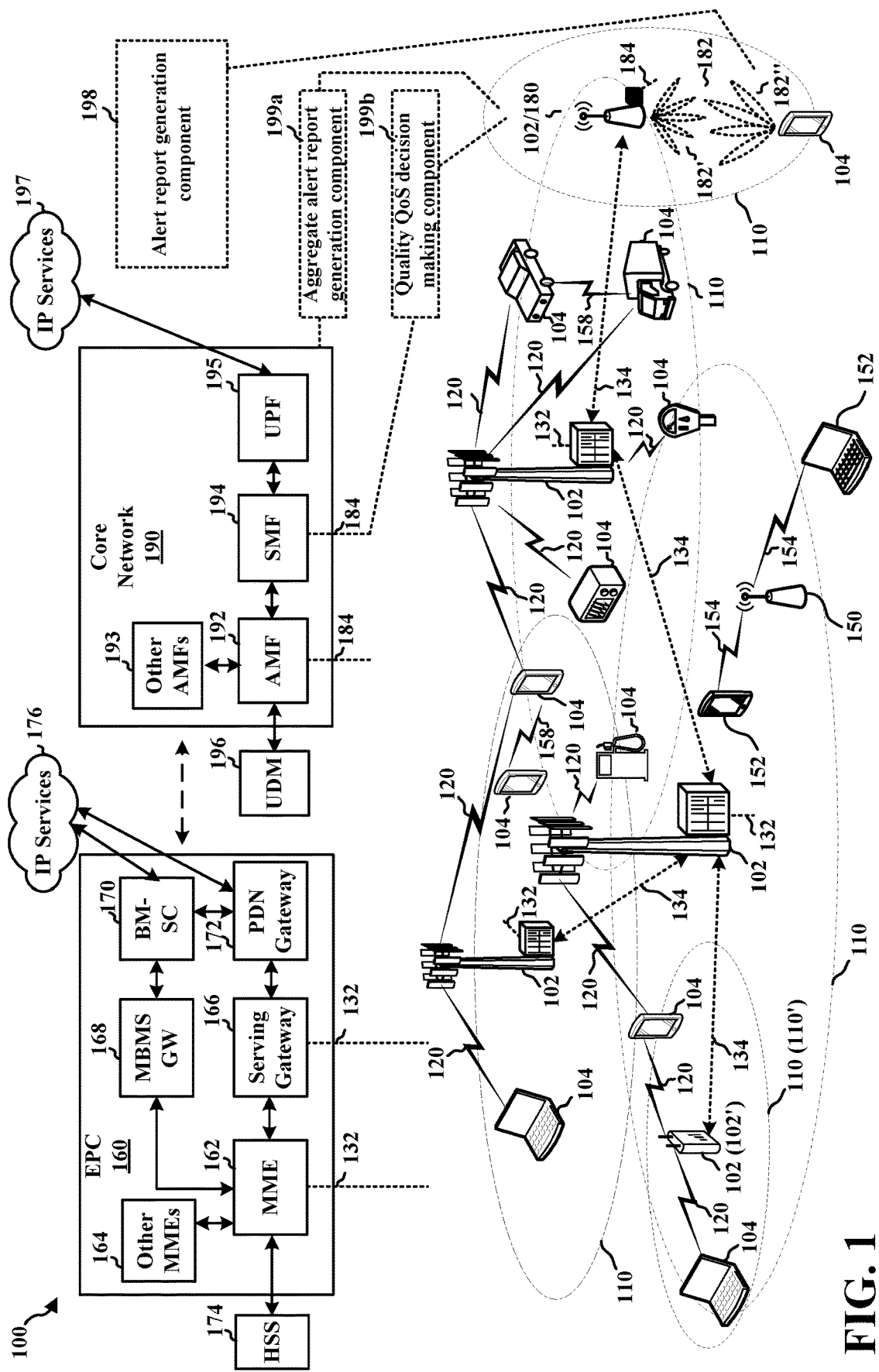
FIG. 1 is a diagram illustrating an example of a wireless communications system and an access network, in accordance with various aspects of the present disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

There are no known procedures in wireless cellular networks as to how a network manages its nodes to detect and collaboratively deal with a malicious node (e.g., an adversary) among authorized UEs. The present disclosure applies to PHY-based security techniques to manage malicious nodes. In various aspects of the present disclosure, a set of PHY procedures is disclosed that, among other features, enables network entities and UEs to detect malicious nodes in collaboration. The detection may occur by proactively or reactively employing one or more base stations (e.g., gNBs), user equipment (UEs) or other network entities to assess the presence of an adversary, or by gathering alert reports from different base stations or UEs. The alert reports include information concerning one or more already detected adversaries. In addition, these aspects enable the network entity to execute necessary PHY or cross-layer security protection techniques to return the security and reliability level of the network to a desired level.

Upon detecting a malicious node proactively or reactively through alert reports, the network or representative entity may execute previously used PHY or cross-layer security techniques, as further explained below. Techniques that provide security at the PHY layer (e.g., measures for control channels and reference signals (RSs)) may bring additional overhead in the form of greater computational complexity, such as in removing the PHY signature, or link traffic, such as in phase exchanges to authenticate the transmitter or receiver. This tradeoff between security provided in PHY and performance may be referred to herein as security quality of service (QoS).

As an example of such a tradeoff, the network may apply a conventional artificial impairment to a signal (e.g., an artificial PHY signature such as an AM/PM type impairment in the case of power amplifiers), such that only authorized nodes possess the parameters sufficient to remove the applied impairment. In this case, the impairment is applied here to protect against unauthorized receivers. However, the authorized receivers still have to perform computations to remove the impairment, which affects the security QoS. As another example, a UE may attempt to authenticate a signal transmission by verifying a transmitter's identity to ensure that a transmission is not originating from a malicious node. One authentication process in the PHY layer is to send the credential in a phase-modulated form and rely on channel reciprocity for authentication. For instance, the phase-modulated credential may be sent not explicitly but in its difference from a previous phase measurement on a received signal so that only the network node sending that previous signal can learn the credential. Thus, the phase information representing the credential cannot be replicated by a malicious node. The transmitter (e.g., another UE or network entity) can send the identifying information back to the UE to verify the transmitter identity to fulfill authentication mutually. As in the previous example, such techniques require additional signaling between transmit and receive sites, and hence additional signaling overhead.

To manage this tradeoff due to computations and link traffic, the network in some implementations may execute PHY or cross-layer security techniques as described in the examples that follow, while proactively detecting a malicious node or reactively acting against already-detected malicious nodes. For example, the network generally does not apply every PHY technique for every user. Instead, the network may assess the capability of a given user (e.g., UE) prior to tasking the user with actions. In short, the principles of this disclosure effectively balance applying current PHY security techniques to manage malicious nodes while managing this tradeoff.

The collaborative techniques disclosed herein provide significant advantages to bolstering security and reliability in 5G networks. Such security and reliability are also envisioned as key performance measures for upcoming 6G implementations and other successor implementations to 5G.

FIG. 1 is a diagram illustrating an example of a wireless communications system and an access network 100. The wireless communications system (also referred to as a wireless wide area network (WWAN)) includes base stations 102, user equipment(s) (UE) 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G Long Term Evolution (LTE) (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G New Radio (NR) (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, Multimedia Broadcast Multicast Service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y megahertz (MHz) (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 gigahertz (GHz) unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, an MBMS Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides Quality of Service (QoS) flow and session management. All user IP packets are transferred through the UPF 195. The UPF 195 provides UE IP address allocation as well as other functions. The UPF 195 is connected to the IP Services 197. The IP Services 197 may include the Internet, an intranet, an IMS, a Packet Switch (PS) Streaming Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Although the present disclosure may focus on 5G NR, the concepts and various aspects described herein may be applicable to other similar areas, such as LTE, LTE-Advanced (LTE-A), Code Division Multiple Access (CDMA), Global System for Mobile communications (GSM), or other wireless/radio access technologies.

Further, although the present disclosure may focus on vehicle-to-everything (V2X), the concepts and various aspects described herein may be applicable to other similar areas, such as D2D communication, IoT communication, Industrial IoT (IIoT) communication, and/or other standards/protocols for communication in wireless/access networks. Additionally or alternatively, the concepts and various aspects described herein may be of particular applicability to one or more specific areas, such as vehicle-to-pedestrian (V2P) communication, pedestrian-to-vehicle (P2V) communication, vehicle-to-infrastructure (V2I) communication, and/or other frameworks/models for communication in wireless/access networks. In these cases, a malicious node may be identified, alert reports generated and transmitted to the network, and a scheme devised to identify an example procedure for dealing with a malicious node.

Referring again to FIG. 1, in certain aspects, the UE may include an alert report generation component 198, which may be a dedicated hardware component, or a processor (set of processors) executing a routine in memory, firmware, or the like. The report generation component may generate a report indicating a presence of an unauthorized network node including information associated with the node. Component 198 may provide the completed alert report to the transmitter for transmitting the alert report to a base station or to a network.

When UE 104 receives a message, the message may indicate a security measure to be applied for communications between authorized network nodes including the UE 104. The message may be received in response to the report and in response to another report from one of the authorized network nodes. The other report may include further information associated with the unauthorized network node. The received message may beneficially include an optimal action or set of actions for managing the malicious node, rather than actions that generically are performed without considering adverse effects that the UE 104 or other network nodes may face.

Similarly coupled to the base station 102/180 and the core network 190 are an aggregate alert report generation component and a Quality QoS decision making component 199b. The base station 102/180 or another network entity (sometimes referred to as the "network") includes an aggregate alert report generation component 199a and a Quality QoS decision making component 199b. The aggregate alert report generation component 199a may receive at the receiver, from other network nodes (including the base station, if the network entity is the core network 190, a component therein, or another entity), a plurality of reports. Each report may be an alert report generated by a network node and indicating a presence of an unauthorized network node. An unauthorized network node, for purposes of this disclosure, is a malicious node or an adversary node. A report may include information associated with the unauthorized network node. The plurality of reports are respectively from a plurality of authorized network nodes. The base station 102/180 or network 190 (or a similar network entity) may next use the received alert reports and other known information about the network to determine an optimal response to repel the unauthorized node and prevent the unauthorized node from accessing data in the network. The optimal response may use Component 199b to advantageously take into account the presence or absence of potential adverse effects on various network components (noise, interference, level of activity, battery needs, etc.) in determining the best strategic response. The base station 102/180 or network 190 may transmit a message indicating a security measure to be applied for communication between the authorized network nodes in response to the plurality of reports. The strategic nature of the response means that, among other benefits, 10 am 10 any impact on network performance is minimized, which is contrary to conventional security approaches concerning the PHY layer.

Figure 2:
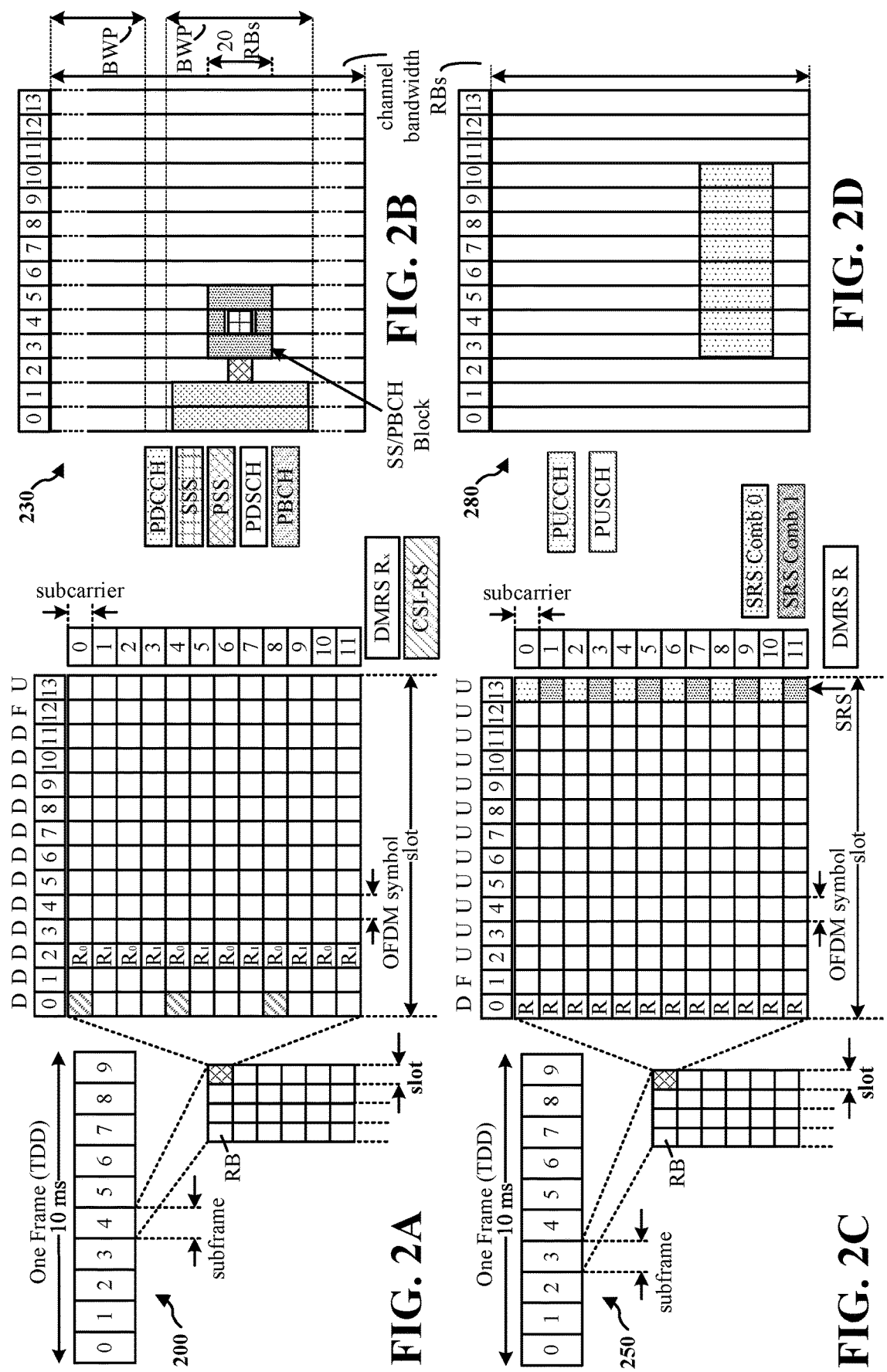
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

Other wireless communication technologies may have a different frame structure and/or different channels. A frame, e.g., of 10 milliseconds (ms), may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) orthogonal frequency-division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies µ0 to 4 allow for 1, 2, 4, 8, and 16 slots, respectively, per subframe. For slot configuration 1, different numerologies 0 to 2 allow for 2, 4, and 8 slots, respectively, per subframe. Accordingly, for slot configuration 0 and numerology µ, there are 14 symbols/slot and 2 slots/subframe. The subcarrier spacing and symbol length/duration are a function of the numerology. The subcarrier spacing may be equal to $2^{\mu}*15$ kilohertz (kHz), where y is the numerology 0 to 4. As such, the numerology p=0 has a subcarrier spacing of 15 kHz and the numerology p=4 has a subcarrier spacing of 240 kHz. The symbol length/duration is inversely related to the subcarrier spacing. FIGS. 2A-2D provide an example of slot configuration 0 with 14 symbols per slot and numerology µ=2 with 4 slots per subframe. The slot duration is 0.25 ms, the subcarrier spacing is 60 kHz, and the symbol duration is approximately 16.67 µs. Within a set of frames, there may be one or more different bandwidth parts (BWPs) (see FIG. 2B) that are frequency division multiplexed. Each BWP may have a particular numerology.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as Rx for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A PDCCH within one BWP may be referred to as a control resource set (CORESET). Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgement (ACK)/non-acknowledgement (NACK) feedback. The PUSCH carries data, and may additionally be used to carry a buffer status report (BSR), a power headroom report (PHR), and/or UCI.

Figure 3:
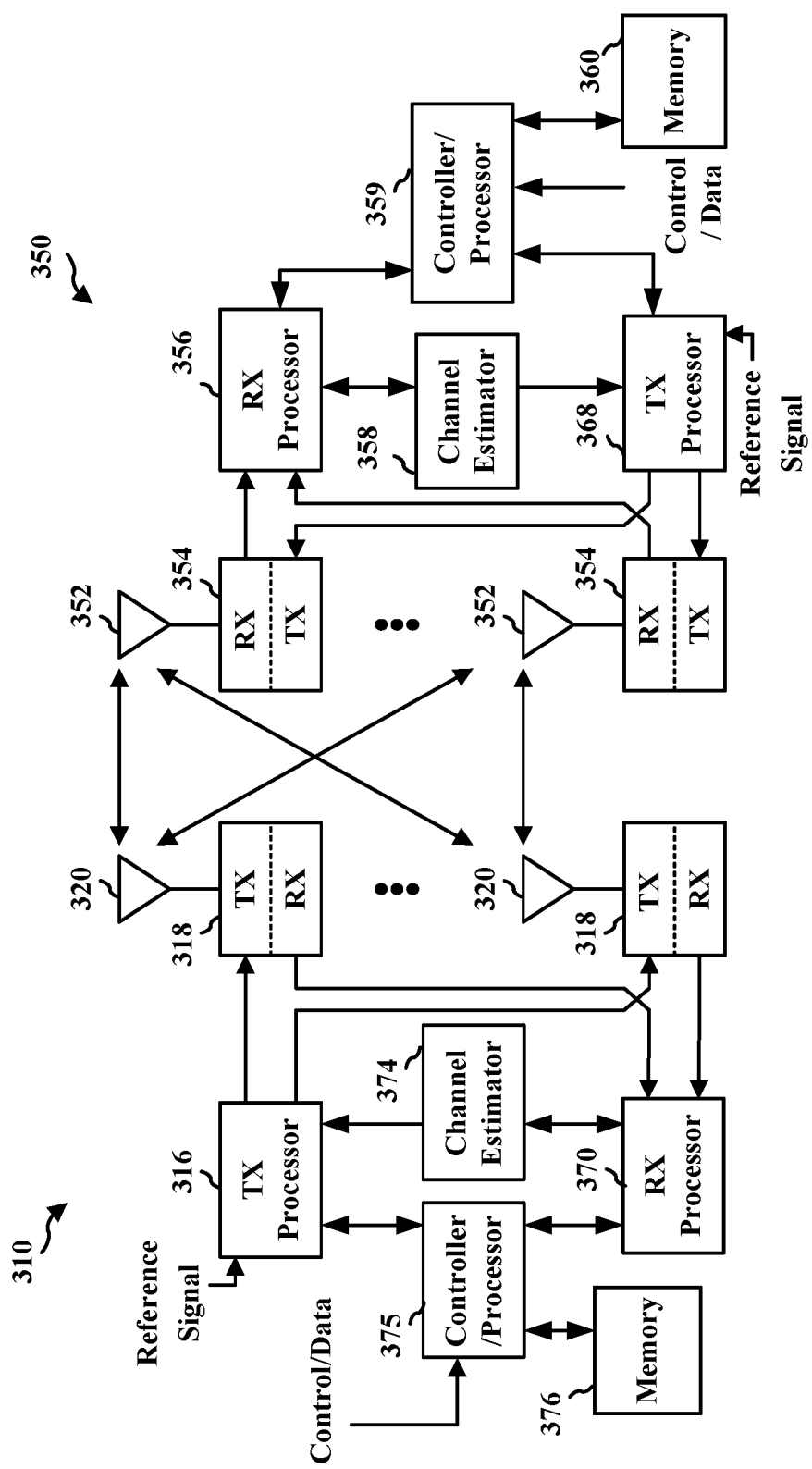
FIG. 3 is a diagram illustrating an example of a base station and user equipment (UE) in an access network, in accordance with various aspects of the present disclosure.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BASK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with 198 of FIG. 1.

At least one of the TX processor 316, the RX processor 370, and the controller/processor 375 may be configured to perform aspects in connection with 198 of FIG. 1.

The present disclosure applies to PHY-based security techniques to manage malicious nodes. As noted above, no known procedure exists in wireless cellular networks as to how the network manages its nodes to detect and collaboratively deal with a malicious node (e.g., an adversary) among authorized UEs. A configuration of PHY security procedures or cross-layer security protection techniques are set forth to address these issues to increase network security and reliability to an acceptable level.

A malicious node as used in this disclosure includes more broadly any unauthorized node, which may be a UE or any physical network presence. Upon detecting a malicious node proactively or reactively through alert reports, the network or representative entity may execute previously used PHY or cross-layer security techniques, as further explained below.

Techniques that provide security at the PHY layer (e.g., measures for control channels and reference signals (RSs)) may bring additional overhead in the form of greater computational complexity, such as in removing the PHY signature, or link traffic, such as in phase exchanges to authenticate the transmitter or receiver. This tradeoff between security provided in PHY and performance may be referred to herein as security quality of service (QoS).

As an example of such a tradeoff, the network may apply a conventional artificial impairment to a signal (e.g., an artificial PHY signature such as an AM/PM type impairment in the case of power amplifiers), such that only authorized nodes possess the parameters sufficient to remove the applied impairment. In this case, the impairment is applied here to protect against unauthorized receivers. However, the authorized receivers still have to perform computations to remove the impairment, which affects the security QoS. As another example, a UE may attempt to authenticate a signal transmission by verifying a transmitter's identity to ensure that a transmission is not originating from a malicious node. One authentication process in the PHY layer is to send the credential in a phase-modulated form and rely on channel reciprocity for authentication. For instance, the phase-modulated credential may be sent not explicitly but in its difference from a previous phase measurement on a received signal so that only the network node sending that previous signal can learn the credential. Thus, the phase information representing the credential cannot be replicated by a malicious node. The transmitter (e.g., another UE or network entity) can send the identifying information back to the UE to verify the transmitter identity to fulfill authentication mutually. As in the previous example, such techniques require additional signaling between transmit and receive sites, and hence additional signaling overhead.

To manage this tradeoff due to computations and link traffic, the network in some implementations may execute PHY or cross-layer security techniques as described in the examples that follow, while proactively detecting a malicious node or reactively acting against already-detected malicious nodes. For example, the network generally does not apply every PHY technique for every user. Instead, the network may assess the capability of a given user (e.g., UE) prior to tasking the user with actions. In short, the principles of this disclosure effectively balance applying current PHY security techniques to manage malicious nodes while managing this tradeoff.

More specifically, to effect this balance in one aspect of the disclosure, a network entity may configure UEs and base stations (e.g., gNBs) to individually prepare alert reports if these entities encounter any situation in which the presence of active or passive malicious nodes is detected or implied. Upon receiving an alert report from any gNB or UE, the network (via the network entity) may next determine which PHY and/or cross-layer security technique to apply upon taking into account the gNB and UE capabilities, and any adverse effects that may be associated with performing the technique in question. Based upon this information, the network entity may determine a time, frequency, and set of one or more spatial (beam) resources for use in applying the identified security technique. For example, an example technique in view of the current information collected may be one that prevents the networked UEs from constantly consuming additional energy. The network entity may thereupon coordinate the gNBs/UEs to relay their individual alert reports in the UL/DL/SL channels as applicable. The network entity may produce its own aggregate alert report together with the gathered information and any additional information. Such additional information may include the location of the malicious node obtained via the network or by a network entity via triangulation. The network may also execute a security check intermittently, or using a prepared schedule. For instance, the network may employ certain designated gNBs/UEs to implement various PHY-based security techniques for use in assessing the presence of the malicious node or other malicious nodes that have since attempted actions adverse to the network. The network may use the information in the one or more reports to perform such a security check. By configuring some gNBs and UEs to apply certain PHY security techniques, and based on the responses the network collects from these nodes, the network may assess the presence of an adversary.

The malicious node may be active or passive. An active malicious nodes generally performs some type of signaling on the network, while a passive malicious node just listens on the network, to gather information or otherwise.

In assessing capability, a network entity may determine whether a gNB/UE can perform specific tasks. For example, a network may elect not to apply every PHY technique for every user. In the case above, the network entity may elect to only apply an artificial PHY impairment to those nodes that the network can validly assume that the nodes have the capability of removing that impairment.

As another example, the network entity may avoid actions that produce unwanted adverse effects in the form of performance loss, such as excess power consumption. For instance, in applying a PHY technique to power limited devices (e.g., battery operated UEs), then the entity may consider whether requiring such nodes to perform security QoS tasks may be problematic for the power-limited device due to using the power-intensive task. Another adverse effect that the network may consider is the excess interference due to the applied PHY technique. As an example, the network may task a gNB to apply an artificial noise PHY technique to fight any malicious node with an unknown location, where the artificial noise is therefore sent towards every direction other than the direction of authorized network nodes (e.g., gNBs, UEs) since the exact location of the malicious node is unknown. However, if this technique is determined to result in some additional interference in the neighboring cell and UEs, the network may take this adverse effect into account as well, and forego applying artificial noise in the cancellation mode, i.e., the artificial noise is now configured as an interference and sent along with the regular transmission to the authorized UE assuming that the UE knows how to remove this interference.

In these configurations, the network can use the information from received reports to apply PHY technique(s) judiciously, rather than use resources only for the sake of providing additional security and reliability at the PHY layer. To avoid unnecessary energy outputs or excessive interference, or other adverse conditions, the network in these aspects can apply the techniques only at specific times, with specific frequency bands, or using specific beams.

In various configurations, the UEs of a network may relay their individual alert reports to gNBs. In other arrangements, to maintain network throughput, a network entity and a gNB can configure the networked UEs to relay their reports to other UEs via a sidelink channel. As noted, an alert report may indicate the presence of a malicious node and features of the UE or gNB that have been obtained or measured relative to the malicious node. An example of such a feature in the reports may include a received signal power, an operating frequency and time slot, a beam angle, directional information, and an identity of the unauthorized node (e.g., a non-valid ID that the malicious node previously attempted to gain access).

In various configurations, the network entity, upon receiving all the alert reports, can also produce its own aggregate report, which not only adds relevant information from all the individual alert reports together but also includes the network's own generated or created information, whether the information is created using or based on the individual alert reports or otherwise. As an example, the network may derive the location of an adversary from the user information included in the individual reports (e.g., using triangulation or other techniques). The network may include that location information in the aggregate report.

Figure 4:
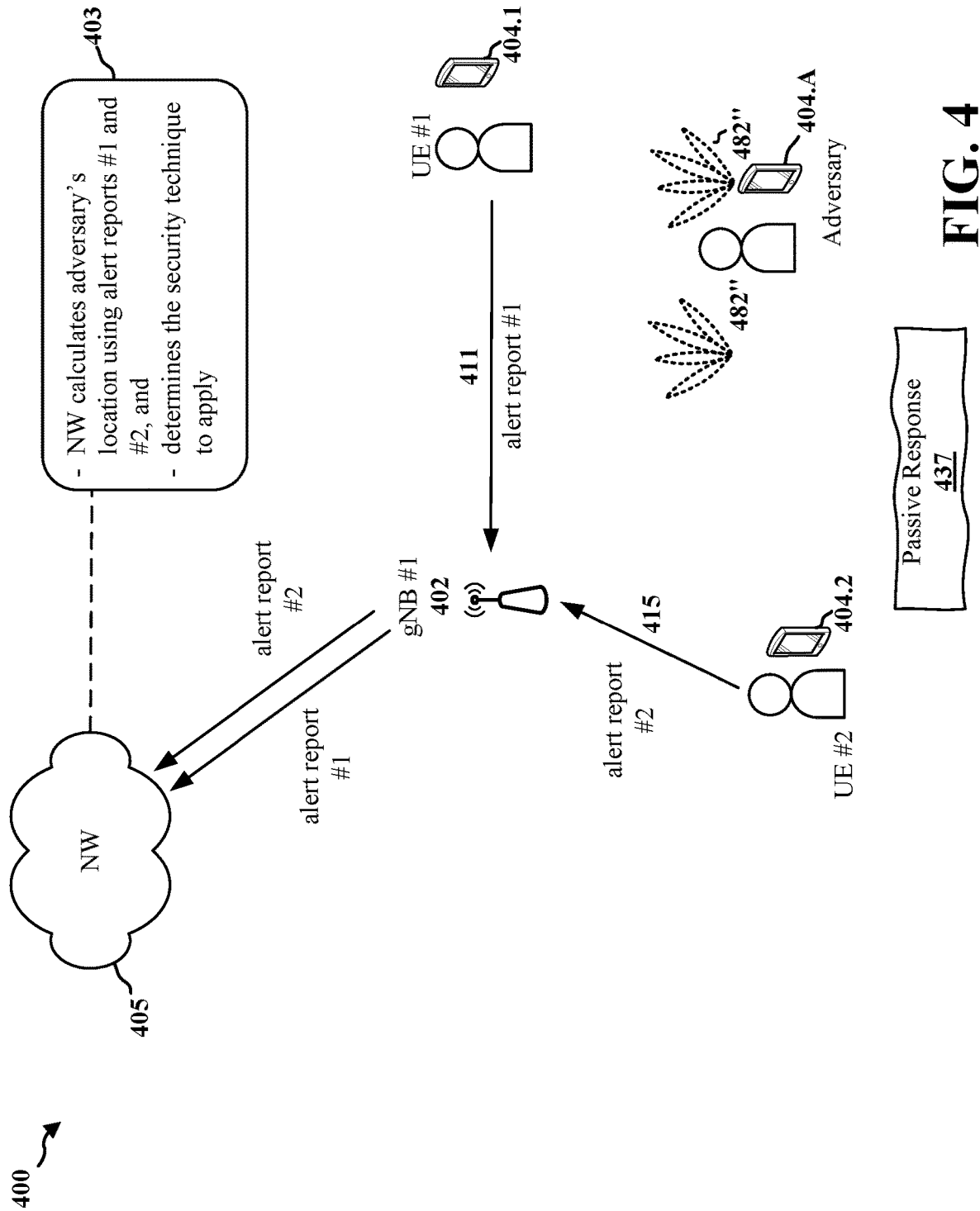
FIG. 4 is a timing diagram illustrating an example of communications between different network entities, and a passive network response against a malicious node, in accordance with various aspects of the present disclosure.

FIG. 4 is a timing diagram 400 illustrating an example of communications between different network entities including a passive network response 437. Network 405 is shown in the upper left of the diagram as a cloud form. Network 405 may include one or more network entities, such as EPC 160, core network 190 (FIG. 1), one or more components in EPC 160 or core network 190, or a combination of such components. FIG. 4 also includes a gNB #1 402, UE #1 404.1, UE #2 404.2, and an adversary UE or other node 404.A. FIG. 4 demonstrates a passive response 437.

One or both of UEs 404.1 and 404.2 may collect information concerning adversary node 404.A, which is a malicious node for purposes of this example. UE 404.1 generates alert report #1 using the information it has collected or computed relative to 404.A and other potential malicious nodes, if any. UE 404.2 likewise generates alert report #2 in a similar manner. As shown by arrows 411 and 415, respectively, UEs 404.1 and 404 transmit their alert reports #1 and #2 to gNB 402, e.g., using an uplink data or control channel.

Thereupon, gNB 402 may transmit the individual alert reports #1 and #2 to a network entity in the network 405. As described in the dialog box 403 coupled to the network 405 via the dashed line, the network entity in the network 405 may calculate the location of the adversary 404.A using the information included in the received alert reports #1 and #2. Based on additional information in the alert reports #1 and #2 received from gNB #1, the network entity in the network 405 may determine the security technique to apply which minimizes adverse events as described above.

It will be appreciated that the network configuration shown in FIG. 4 is simple in nature to avoid unduly obscuring aspects of the disclosure. However, in other circumstances, the network may be configured to include a more complex configuration with additional and different nodes, some of which are described with reference to FIG. 1. In addition, the network shown is 5G NR. However, the network configuration may include one or more additional or different network types. It is further noted that as indicated, the response of the network 405 in this configuration is passive (437). That is to say, the network 405 or controlling entity does not send a response including the determined information in any particular direction. Nor does the network emit this information in a signal to a particular node.

Figure 5:
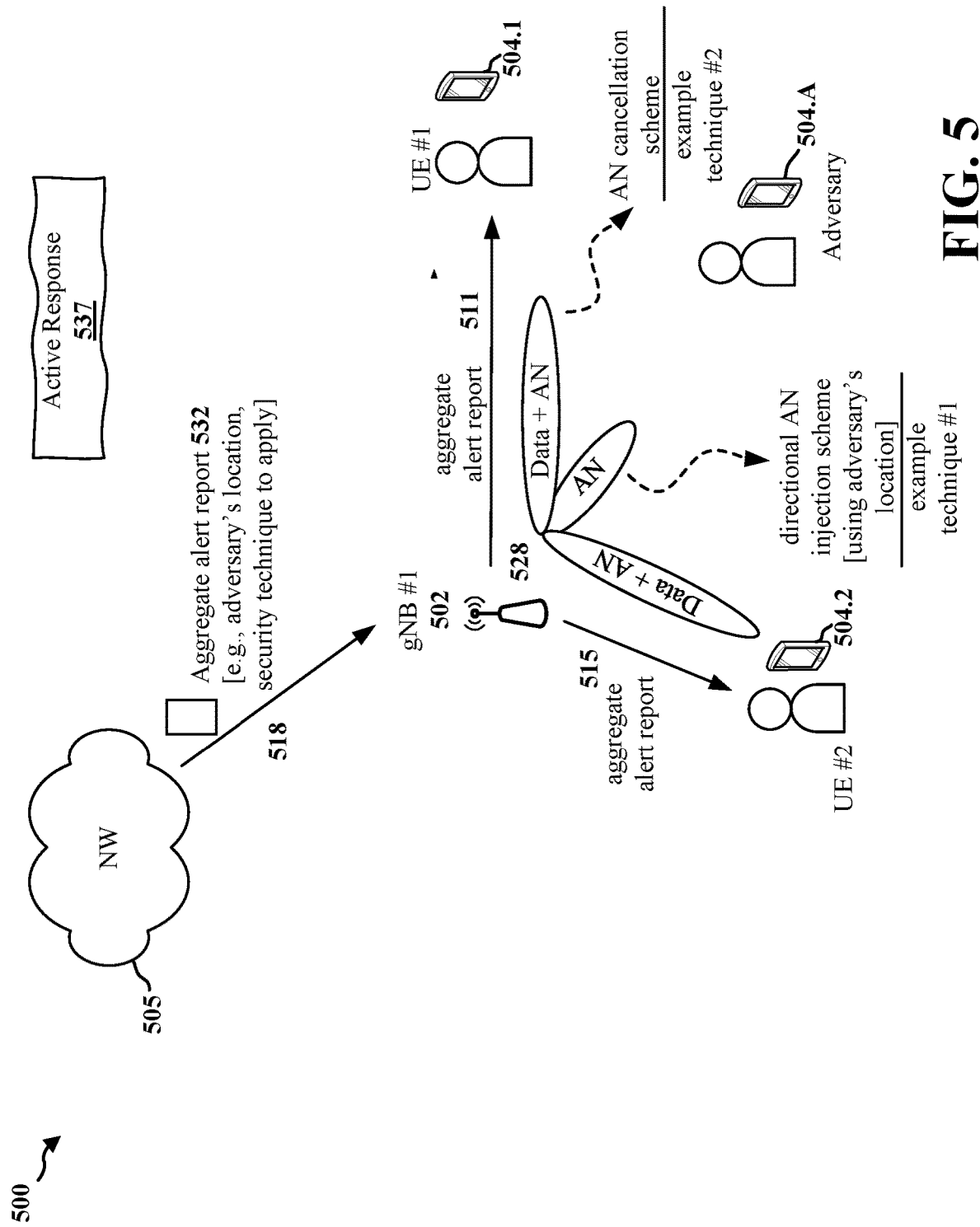
FIG. 5 is a diagram illustrating an example of an active network response against a malicious node, in accordance with various aspects of the present disclosure.

FIG. 5 is a diagram illustrating an example of an active network response 537 against a malicious node 504.A. For purposes of this example, the procedure and configuration in FIG. 5 is a continuation of that shown in FIG. 4. Thus, in this configuration, gNB 502 and 402 are the same. In addition, the network 505 is the same as network 405 in this configuration, the UEs 504.1 and 504.2 are the same as UEs 404.1 and 404.2, and the adversary (malicious) node 504.A is the same as 404.A. This need not be the case in other configurations.

Referring to FIG. 5, after calculating the location of adversary (malicious) node 504.A (e.g., by triangulation) and determining the optimal security technique to apply as described with reference to FIG. 4, a network entity in the network 505 may assemble this information with potentially other relevant information the network possesses, calculates or determines into an aggregated alert report 532. The network entity in network 505 may send the aggregated report 532 over a channel to the gNB 502. In turn, gNB 402 may release the aggregate alert report 532 (which for purposes of this disclosure may be deemed to include a modified version thereof) to UEs 504.1 and 504.2 so that every node in the network is aware of the aggregated alert report 532.

One example of a PHY technique according to some configurations that is directed or suggested by network 505 in FIG. 5 in the aggregate alert report 532 is a directional artificial noise (AN) injection scheme. As briefly described above, AN involves inserting artificial noise having one or more amplitudes, frequencies, or phases into a signal to render it difficult for the malicious node (adversary 504.A) to effectively capture the message.

With continued reference to FIG. 5, it is assumed for this example that a network entity in the network 505 has successfully determined the location of adversary 504.A as additional information to incorporate into the aggregate alert report 532 circulated to the authorized network nodes. This may take place, for example, via the network's triangulation of data included in the individual alert reports #1 and #2 received in FIG. 4 by the network (then 405). The circulation of the aggregate alert report by the network 505 enables the network to inform the gNB 502 and UEs 504.1 and 504.2 of the location of the adversary 504.A. These three nodes may apply directional AN toward the adversary's location in response.

For example, FIG. 5 shows three spatial transmit beams 528 configured by gNB 502 in response to an instruction to communicate with UEs 504.1 and 504.2 using AN. Here, the gNB 502 partitions the beam into three segments. One of the horizontally-disposed spatial beams relative to the figure includes data intended for the UE 504.1 along with AN for interfering with the data. Similarly, one of the vertically-disposed spatial beams also includes data intended for UE 504.2 along with interfering AN. The diagonally-disposed third spatial beam is oriented directly along the path of the malicious node 504.A's location, and includes only the AN. It is assumed also for this example that UEs 504.1 and 504.2, being authorized nodes, are aware of the AN measurements in order to successfully segregate the data from the AN through applicable decoding techniques. The adversary node 504.A may receive a stronger AN signal by virtue of the diagonal spatial beam, and additional AN due to the horizontally and vertically disposed beams. The presence of AN in each of these spatial beams may significantly degrade the quality of any data that may be received by the malicious node 504.A over the applicable channels.

In the example above, while the gNB 502 provided the AN, other configurations may be such that one of the UEs 504.1 or 504.2 may instead (or additionally) provide the AN along with upstream data intended for the gNB 502. The use of this configuration may be influenced or determined by a decision of the network 505 as to what steps to take to ameliorate the risks of the identified malicious node capturing data from the network in view of factors such as the available power of the UEs, the location and orientation of the respective nodes, etc.

In various embodiments, the network 505 or UE may elect to implement AN cancellation. In a case where the network 505 cannot determine the specific location of the adversary (malicious node), the other network nodes thus do not know the location from the aggregate alert report. As such, neither the network 505 nor any of the network nodes can use directional AN. Instead, they may apply AN cancellation. In AN cancellation, a node (such as the base station) may inject artificial noise on top of the data it sends to the UEs. Knowing the AN parameters, the UEs can cancel the AN from the signal to recover the data, but the adversary 504.A cannot cancel the AN, which ideally prevents the adversary from decoding the associated data. In some configurations using AN cancellation, gNB 502 may design the AN based on the channel of the authorized UE, and, thus, any adversary naturally with a different channel cannot eliminate the AN interference even if it captures the associated data impaired by this AN interference.

In a case where the gNB instead is able to apply a directional AN noise scheme as discussed above (e.g., the location of the malicious node 504.A is known), the gNB may take into account the interference that the AN will impose on neighboring cells were the gNB to apply the directional AN scheme. Depending on the amount of interference, the gNB may elect to change the technique to another technique (e.g., AN cancellation) for example. Accordingly, these implementations of the disclosure provide the network nodes with dynamic flexibility in determining what scheme is best in light of different considerations. Here, if the interference on neighboring cells would be marginal, directional AN may be decided to be a more strategically sound option. If, however, the interference level on one or more adjacent cells is significant, the gNB may opt for AN cancellation to reduce the interference that nearby authorized nodes might otherwise experience.

As is evident from FIGS. 4 and 5 and where appropriate in the context, the present disclosure uses the terms "network" and "network entity" interchangeably. In some configurations, the network may include a base station (e.g., a gNB), or the core network 190 or a component within core network 190 (FIG. 1), etc.

In another aspect of the disclosure, techniques are disclosed for the network to act proactively or reactively, depending on the circumstances present. For purposes of this disclosure, reacting proactively refers to acting without any concrete information on the presence of malicious nodes, whereas reacting reactively refers to acting after receiving UE/base station alerts concerning the malicious node(s). Any node, including without limitation any UE and/or gNB, individually may assemble an alert report if they encounter any situation suggesting the presence of an active or passive malicious node. Such a situation may occur in the following example cases.

As one such example, UEs may insert artificial PHY signatures in their signals as a security technique, which authorized receiving UEs can decode. In some cases, however, the PHY signature that a UE is expecting differs from the actual received signature. From such a scenario, an active malicious node can be fairly implied. As another example, UEs may apply a CSI-based AN injection scheme that adds AN to a data signal that a receiving UE can decode because the AN is designed based on the channel state information (CSI) of the authorized receiver. If the data bits are not decoded correctly at the UE (e.g., the CRC fails)—at least for several times—despite that the received signal-to-noise ratio is sufficiently high, then the presence of an active malicious node can be inferred.

In still another example, the UEs may apply a PHY-based authentication scheme using exchanged phases of the signal to verify a sender of the data before the data itself is sent. If a transmitting UE engages in such a scheme but observes repeated authentication failures with a particular receiving node, the UE may determine that the receiving node which could not be authenticated is a passive malicious node. For instance, a UE may provide a phase value to a node, which the UE expects the receiving node to apply to modulate a signal from the node back to the UE including the node's identity. Thus in one case, the UE may expect the node to apply QPSK or other phase modulation on its identity and provide that modulated identity back to the UE based on a channel reciprocity between the UE and the node. If the received identity is not decodable or otherwise does not match an authentic identity the UE expects, this fact is a fair indication that the other node is a passive malicious node.

In other aspects, upon receiving an alert report from any UE or gNB, the network may determine which PHY or cross-layer security technique(s) to apply as well as the parameters of the technique(s). Together with this determination, the network may take into account any adverse effects considering details like the current network topology, the activities of the nodes, and the capabilities of the gNBs/UEs to be incorporated into the implementation of the technique. With respect to current topology, as noted, if a specific technique may stand to cause interference on neighboring cells, this interference can be taken into account as weighing against using the relevant technique. Activities of the nodes include, for example, whether a specific technique would affect active nodes served by the serving base station.

When a UE detects a malicious node, this information regarding the malicious node may be only approximate (e.g., an approximate time slot in which the malicious node is present, an approximate direction of the malicious node, an approximate power level of a signal from the malicious node, etc.). UE may not be capable of precisely determining the location of the adversary based on the UE's limited antenna beamwidths and other factors. Thus the UE may still provide what information it does have in an alert report to the network so that the network may collect all the information regarding that malicious node from other UEs or base stations. With this aggregate information, the network may determine the adversary location based on the collaborative effort. The NW can then proceed to choose a security technique to apply in view of that malicious node, while taking into account the technique's adverse effects on the UEs and other factors discussed above.

The NW may also consider the resources in which to apply the technique. For instance, one alert report may indicate one frequency band in which the adversary was observed, while another alert report from another user may observe a different frequency band. Thus, the network may conclude that if the observed adversary across the bands is the same as between the two UEs, the network can indicate both specific frequency bands as the resources in which the technique is to be applied.

As another exemplary security technique, the network can select a PHY signature type and relevant parameters to be implemented at the gNB(s) such that respective UEs can remove the signature. The network may determine to apply a PHY signature embedding technique if UEs are capable of removing the embedded signature.

For an artificial noise (AN) injection strategy, the network may decide if the technique to be applied should be directional in nature, or non-directional. This determination may be facilitated based on the availability of the CSI of the UEs to be impacted by the gNBs that would transmit the AN. The information in the respective CQI report can also be used. The network further may consider any interference management capabilities of the neighboring cells to assess the impact of directional AN transmission.

The network can apply an AN cancellation technique if the UE can cancel the AN. Also, because the AN is based on the CSI, the network would likely only apply this technique if the network is aware of the CSI of the UE at issue. Similarly, the network may instead apply an AN directional technique if the network has determined, or is made aware of, the direction or specific location of the adversary/malicious node.

In various configurations, the network applies the chosen technique in determined time and frequency resources, as noted above. The network may also apply the selected PHY and/or cross-layer security technique in concert with factors like when to begin and end executing the selected security procedures, what frequency bands to use, and the like.

The network may exploit the information provided in the alert reports relative to the malicious node to determine the time schedule and security technique to use. For example, if the malicious node was active in previous slots, the NW may extrapolate from the alert reports the slots in which to apply the techniques at a future time based on an historical activity pattern of the malicious node. To this end, the alert reports from different users may be indicative to the network of what specific pattern the adversary follows, and the slots in which that adversary will be active. Thus, in some configurations, the time when the technique should be applied may be extrapolated based on these patterns, if available.

In various embodiments, the network may coordinate with the gNBs to apply the selected technique only when necessary and only for a given time period, in order (i) not to force UEs to constantly consume unnecessary energy based on carrying the necessary tasks for the activity at issue, and (ii) not to effectively congest or jam the selected time and frequency slots constantly. In following these guidelines, the network can guide a highly effective set of carefully selected security techniques that eliminates malicious nodes from the network using modest resources compared to conventional techniques.

To provide additional flexibility in the process, the network may coordinate the gNBs and the UEs to relay their individual alert reports in an optimal channel depending on network conditions. These channels may include uplink downlink, or sidelink channels.

In various configurations, the network may produce the aggregate alert report based on the individual alert reports coming from gNBs/UEs, and may relay the aggregated alert report to the network nodes over a L3 link or over an authentic and PHY secure L1 link (e.g., relying on channel reciprocity and a phase value exchange by transmitters and receivers to securely authenticate the transmitters as previously described).

In various configurations, the network may also obtain the location of the malicious node by using the individual alert reports provided by different gNBs/UEs (e.g., via triangulation) and share it within the aggregated alert report. The NW may further insert the information concerning the selected security technique and its parameters (e.g., technique type such as directional AN, time schedule and frequency resources used to execute it) into the aggregated alert reports.

Along with PHY signature embedding and AN injection as among the effective security-protection strategies, the network may in some configurations implement other alternative PHY or cross-layer techniques, including but not limited to the following:

(i) Additional authentication protection—in this strategy, the network directs the gNB to reauthenticate the receiver using the phase difference technique (provided directly in PHY via a requesting authentication tag for any transmission and/or via PHY-secure credential exchange).

(ii) Scrambling sequence—rather than obtaining a seed for a scrambling sequence (for PDSCH or PDCCH) from an upper layer or physical cell ID, both of which can be guessed by a malicious node, in one implementation, the network instructs the transmitter and receiver to obtain a hybrid seed based on a common channel between the nodes (e.g., the nodes may measure a specific feature of the channel and apply that value to obtain the seed). Because the channel is specific to the transmitter and receiver, the seed will be unguessable at the malicious node.

(iii) Upper-layer encryption algorithms—these techniques are examples of a cross-layer technique that the network may choose to apply. Because the upper layer of a node cannot determine the presence of an adversary, the network may instruct the nodes to send an indication from the physical layer to the upper layers in response to detecting an adversary at the PHY level. Responsive to receiving this indication, the upper layer may increase an applied encryption key length already in use by the transmitter and receiver (e.g., from a 128 bit to a 256 bit key length).

(iv) Intentionally fake PHY signature—in these configurations, if a UE uses PHY signature embedding as an initial security technique, the UE generally has to communicate its parameters for the artificial signature to another node for that node to be able to cancel the signature from the signal. In so doing, it is possible that a malicious node may be the one requesting the signature parameters. As a result, the network may instruct the UE to send fake signature parameters to such nodes to prevent them from being able to decrypt the data in the signal.

While a few exemplary techniques are described above, a number of other techniques may be used additionally or alternatively without departing from the spirit and scope of the present disclosure.

In another aspect of the disclosure, the network entity may proactively perform a security check intermittently (on demand) or according to a given schedule in which the NW instructs nodes to implement certain techniques to detect malicious nodes.

As an example, the network may employ some nodes may apply secure authentication techniques (which modify the phase-difference technique previously described). Here, the network silences authorized UEs, instructing the authorized UEs not to respond to a request from a certain gNB or within a certain resource (time, frequency, beam). The network may also instruct that gNB to transmit an authentication request to other nodes requesting their identities. Normally, this authentication request would be followed by a configuration transmission desired by a malicious node, such as the parameters of an artificial PHY signature that the node may use to decrypt data. To obtain this data, the malicious node likely will want to acknowledge the authentication request according to the standard process. However, this response is in actuality used to trap the malicious node, because the authorized UEs have been instructed by the network not to respond back. If the gNB receives a response, the gNB can then assume that the transmitter is a malicious node. The gNB can also verify this fact by checking whether the received identity is authentic (e.g., by comparing it to a list of authentic identities). The gNB may accordingly provide this information in its alert report to the network entity.

This approach is in contrast to the reactive approach illustrated in previous slides, in which the network responds to detection of an adversary by a base station or UE passively or actively. In this aspect, an adversary initially had not been detected. Instead, in this aspect, the network proactively initiates a procedure to determine if any adversaries are present. Once an alert report is sent to the network in response to the proactive procedure, the technique selection by the network and other aspects of the disclosure can resume as described above.

Figure 6:
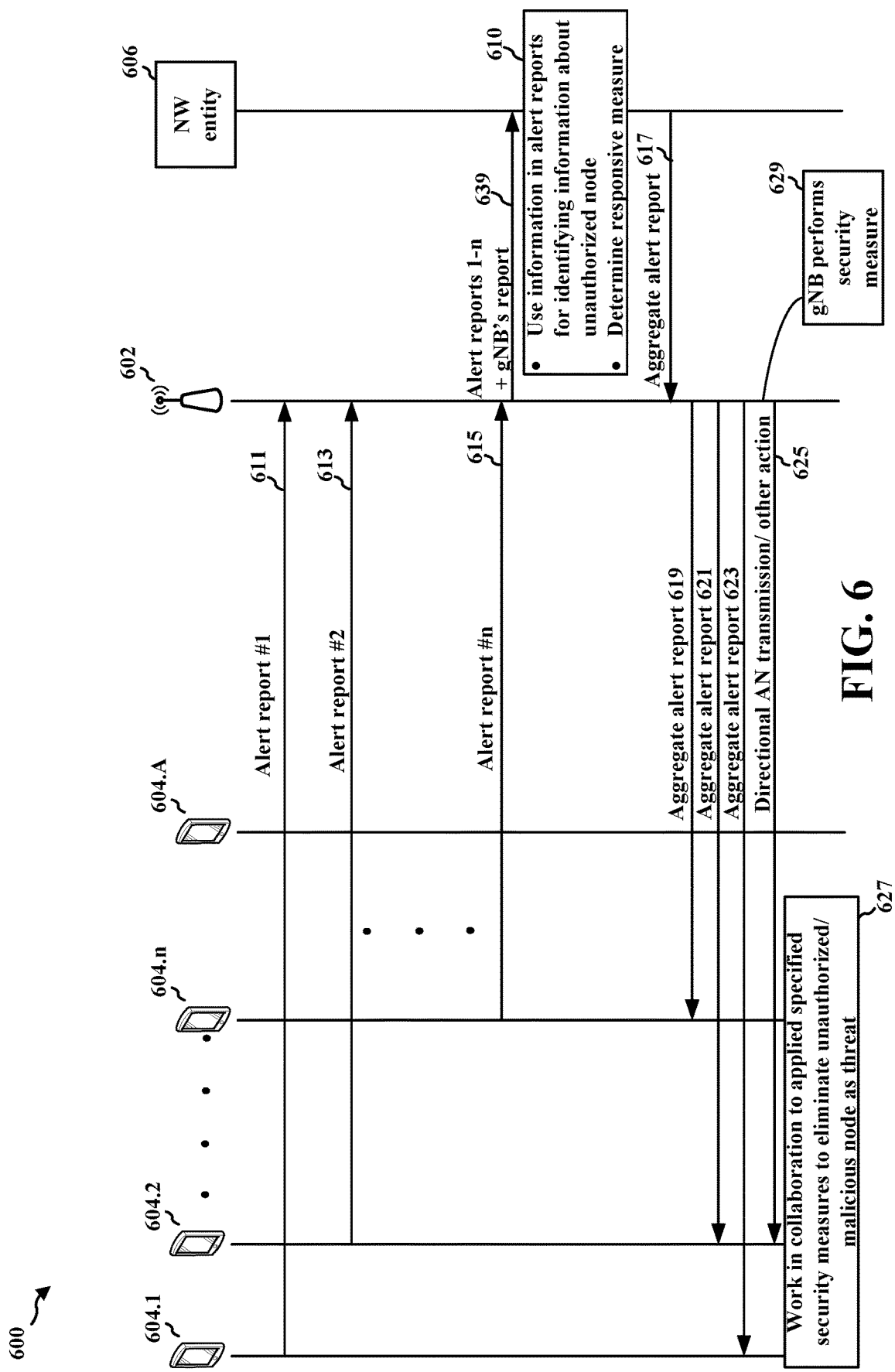
FIG. 6 is a diagram illustrating an example of an active network response against malicious nodes, in accordance with various aspects of the present disclosure.

FIG. 6 is a timing diagram 600 illustrating an example of an active network response against malicious nodes. A gNB 602 is shown. It is assumed that the gNB 602 is among a plurality of nodes. For simplicity, the nodes are represented in FIG. 6 as UEs 604.1, 604.2 . . . 604.*n*, wherein 604.*n* is the last node in the cell, n being a total positive integer number supported by the gNB 602. While UEs are shown, any number of network configurations as well as UE types can be used (e.g., vehicles, pedestrians, parking meters, etc.). The gNB is connected in this embodiment via a backhaul link or other communications link to a network entity 606. The network entity 606 may be part of the core network, or it may be a base station in some configurations. The type of network entity 606 used may depend on the network configuration. In this example, a 5G NR network is assumed.

In some configurations, one or more of UEs 604.1, 604.2 . . . 604.*n* may have been previously functioning in this cell or an adjacent cell, or they may have recently joined the cell. In various configurations, the gNB 602 or network entity 606 may send an instruction for the UEs 604.1-.n to submit alert reports. In other configurations, alert reports may be sent intermittently or periodically.

With continued reference to FIG. 6, each of UEs 604.1, 604.2, etc., up to 604.n separately transmit alert reports #1 over uplink channels 611, #2 over 613, etc. up to #n over 615. The alert reports include information known to a particular UE about potential unauthorized nodes (also referenced herein as malicious nodes or adversaries), including the types of information discussed in configurations above such as relative location, receipt of false signatures, etc. After receiving the alert reports, the gNB 602 may transmit the alert reports 1-n, e.g. via a backhaul link or other wired or wireless communication link, to NW entity 606.

NW entity 606 thereupon may use the information in the n alert reports as a basis for identifying information about the unauthorized node, as in 610. NW entity 606 may determine a proper security mechanism, as needed, for responding to the presence of malicious node—in this instance, UE 604.A. To this end, the NW entity may take into account the information provided by each individual alert report. The NW entity may attempt to locate the malicious node, if the location has not already been identified, via triangulation or another approximation technique using data in the alert reports. As described in foregoing configurations, the NW entity 606 may also take into consideration the activities and resources of the nodes in the network when determining an appropriate security measure or set thereof. In other embodiments, one or more of the UEs may have already taken periodic measures of one kind or another relative to malicious nodes in general—or malicious node 604.A in particular- and sent the results of that information to the gNB, where the information was ultimately sent to the NW entity 606.

After taking the adverse effects into account, or contemporaneously with this process, the network entity 606 may thereupon assemble an aggregate report which includes relevant information from each of the reporting UEs about the malicious node 604.A or other prospective malicious nodes. The aggregate report may also include information concerning adjacent cells, which may have come from a gNB's individual report sent over link 639.

At 617, the network entity may transmit an aggregate alert report over link 617, which may be the same physical medium as 639 in some cases, back to gNB 602. In addition to receiving a copy of the aggregate report, the gNB may transmit copies of the report, e.g., using downlink channels 619, 621, 623 up through channel 615 for UE 604.n. The aggregate report may contain a set of data relating to malicious nodes (including node 604.A), as well as instructions as to how each individual node can work collaboratively under the security mechanism selected initially by the NW entity 606. The aggregate alert report may include instructions for one or more specific measures to be taken that will balance neutralizing the threat of the malicious node 604.A with minimizing the use of network resources, minimizing interference, and minimizing the potential overuse of power in devices operating wirelessly.

Thus, in some configurations, one or more UEs may be tasked with performing some measure to avoid the malicious node from corrupting the network or gaining access to sensitive data. In the example shown in FIG. 6, the gNB 602 has been tasked with performing a security measure 629. For example, as shown, the gNB has been instructed when sending data to one or more of the UEs over wireless channel 608 to use directional AN transmissions 625, although other actions may be equally or more suitable depending on factors like the location of node 604.A relative to the other nodes and the location of nodes in adjacent cells. In this case, it may be assumed that the gNB uses multiple spatial beams to transmit artificial noise in the direction of node 604.A, while transmitting a combination of data and AN to the node(s) slated to receive the data.

Having received the aggregate alert report and knowing other facts in advance, the authorized nodes 604.1-n may be uniquely positioned to decode the data from the injected AN. As noted, one or more additional or different tasks may be used to defeat the malicious nodes, whether initiated by the UEs, the gNB, the NW entity, or some combination thereof, e.g., as enumerated in the aggregate alert report. For example, in FIG. 6, UEs 604.1-n may be additionally or alternatively tasked with performing other collaborative tasks 627 that keep network burdens to a minimum while effectively flushing out malicious nodes like UE 604.A. These collaborative efforts may include any combination of existing tasks, such as one or more of those tasks disclosed previously.

Figure 7:
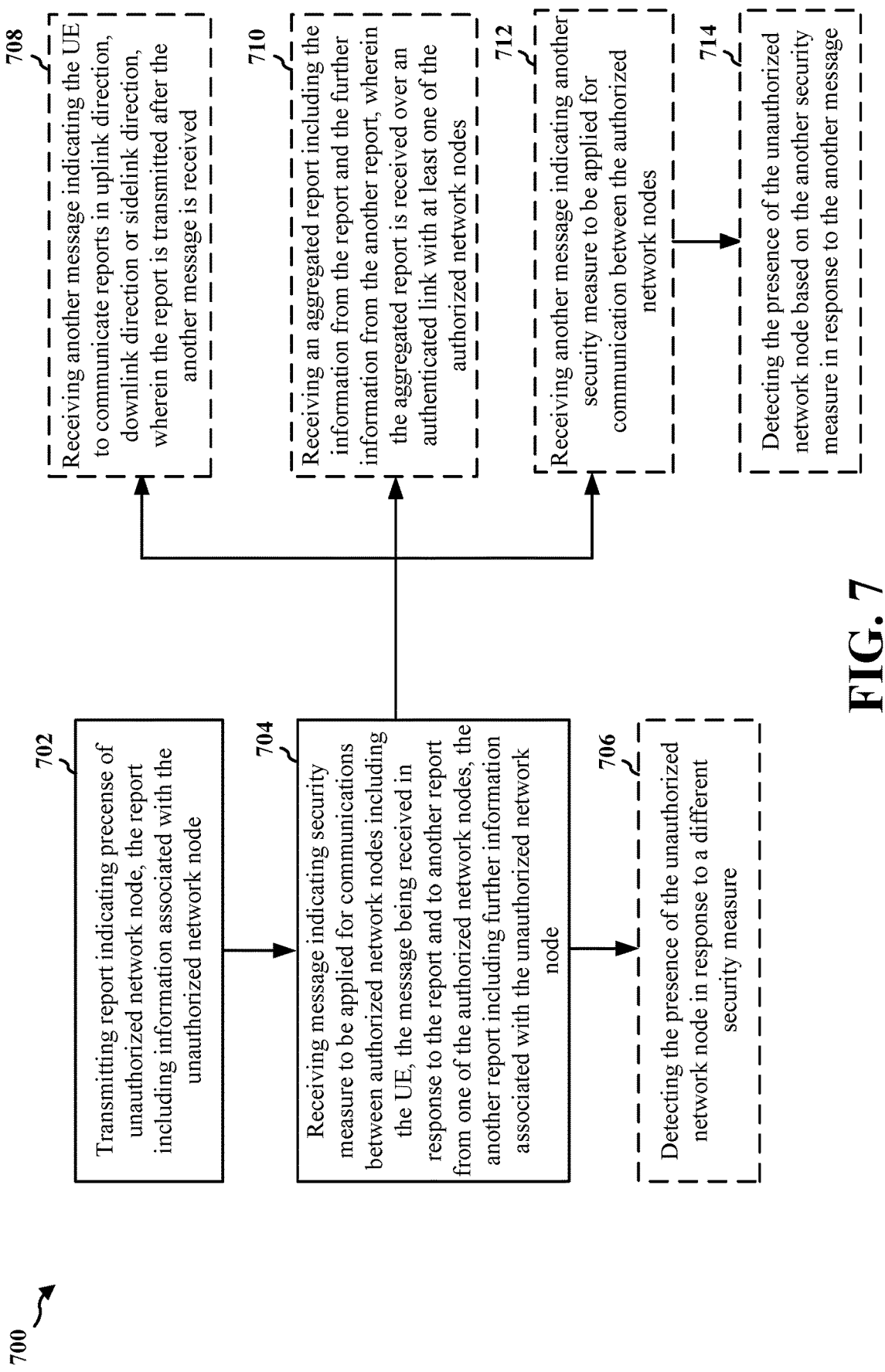
FIG. 7 is a flowchart of a method of wireless communication, in accordance with various aspects of the present disclosure.

FIG. 7 is a flowchart of a method of wireless communication. The steps in FIG. 7 may be performed by any of the UEs 104 in FIG. 1, UE 350 (FIG. 3), UEs 404.1 or 404.2 (FIG. 4) and 504.1 or 504.2 (FIG. 5), any of UEs 604.1-n (FIG. 6) and apparatus 902 (FIG. 9), for example. UEs in different types of networks may also be used to perform the steps in FIG. 7.

With initial reference to 702, the UE may transmit an alert report indicating presence of an unauthorized network node, the report including information associated with the unauthorized network. Thereupon, at 704, the UE may receive, from a base station or network entity, a message indicating a security measure to be applied for communications between authorized network nodes including the UE, the message being received in response to the report and to another report from one of the authorized network nodes, the another report including further information associated with the unauthorized network node. The another report may, for example, be transmitted from one of the other UEs of the network, the gNB, the network entity or another network entity, or the like.

Using the information from the received message, the UE may detect the presence of the unauthorized network node in response to a different security measure. For example, the UE may detect the unauthorized network node by detecting that the type of security measure associated with the unauthorized network node is different than the security measure type of an authorized network node. In another example, the UE may detect the unauthorized network node by detecting that the security measure may be performed over a different period of time than the security measure of an authorized network node. In another example, the UE may detect the unauthorized network node by detecting that the security measure associated with the unauthorized network node has a different effect on authorized network nodes than the security measure of an authorized network node. The UE may perform one of the tasks identified in this disclosure, for example, or another known task, and it may do so in some cases while collaborating with other UEs.

In various configurations, such as at 708, the UE may receive another message indicating the UE to communicate reports in an uplink direction, a downlink direction or a sidelink direction, wherein the report is transmitted after the another message is received. Thus, while FIG. 6 discussed the transmission of reports in specific directions, this need not be the case, and the network entity or gNB may take advantage of other transmission methods to avoid being a network bottleneck, among other motivations. The flexibility of this multi-channel use provides significant benefits in cases where one of the directions is more available than another, or a sidelink is free, to name a few possibilities.

In other configurations, the UE may receive at 710 an aggregated report including the information from the report and the further information from the another report, wherein the aggregated report is received over an authenticated link with at least one of the authorized network nodes. Thus, the aggregated report can provide substantial benefits by including messages and information from different authorized nodes. The aggregation of the report can, unlike in conventional methods, provide a tool for enabling the UEs and other nodes to work collaboratively, such that the measures taken against unauthorized nodes are not only effective, but also do not overtax the network and its resources unnecessarily, and do not degrade communications or unnecessarily increase interference, e.g., in cases of high priority data or due to the current positioning of nodes.

The actions taken need not be isolated; they may be collaborative and repetitive, intermittent, or periodic, as needed. At 712, the UE may receive another message indicating another security measure to be applied for communication between the authorized network nodes. Thus, depending on the threat and the nature of the network, more than one security measure, or more than one type of security measure, may be taken to further the objectives identified above. At 714, the UE may successfully detect the presence of the unauthorized network node based on the another security measure in response to the another message. Thus, in some configurations, more than one security measure may be used to thwart the unauthorized node.

Figure 8:
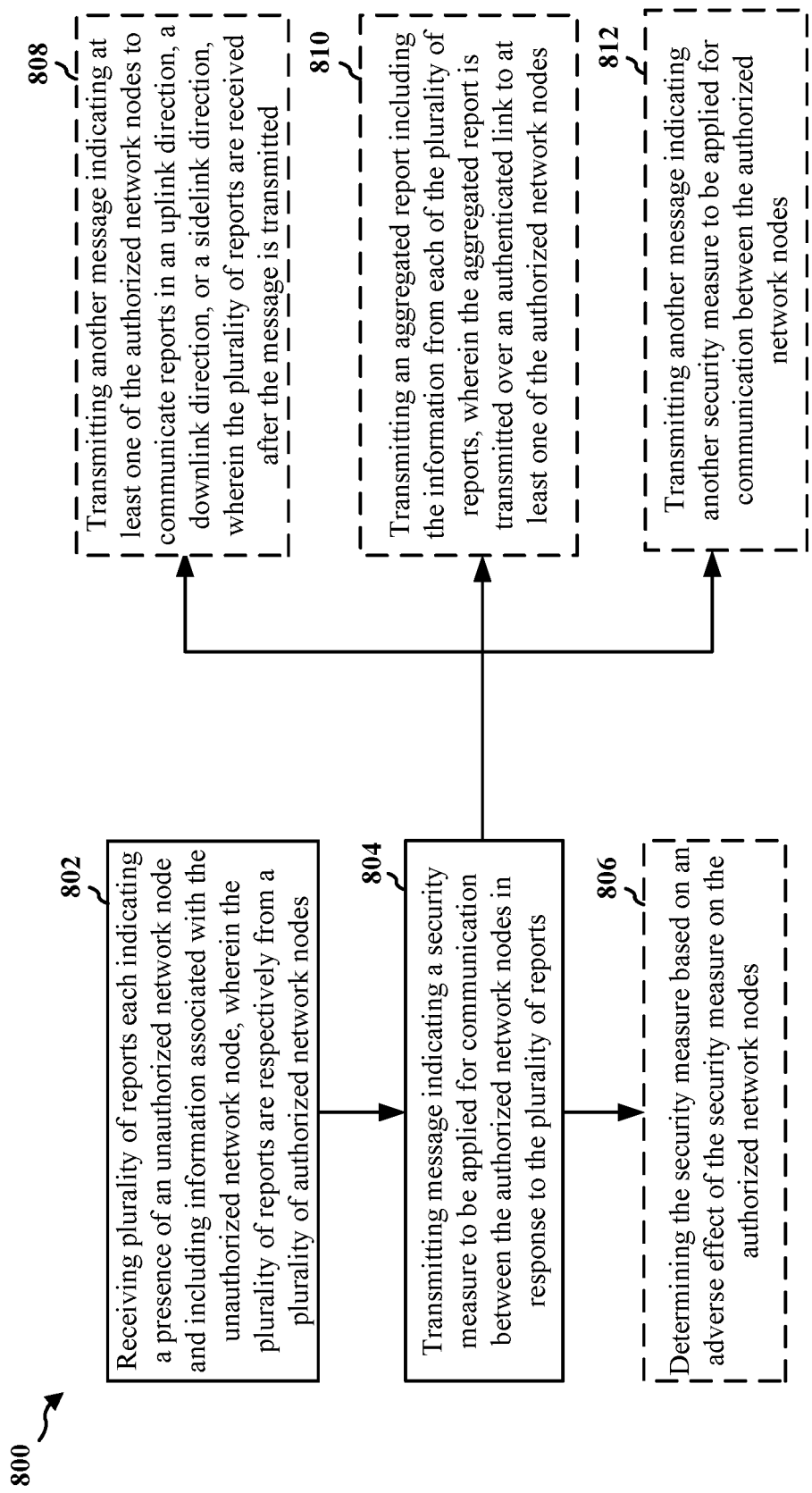
FIG. 8 is a flowchart of a method of wireless communication, in accordance with various aspects of the present disclosure.
Figure 10:
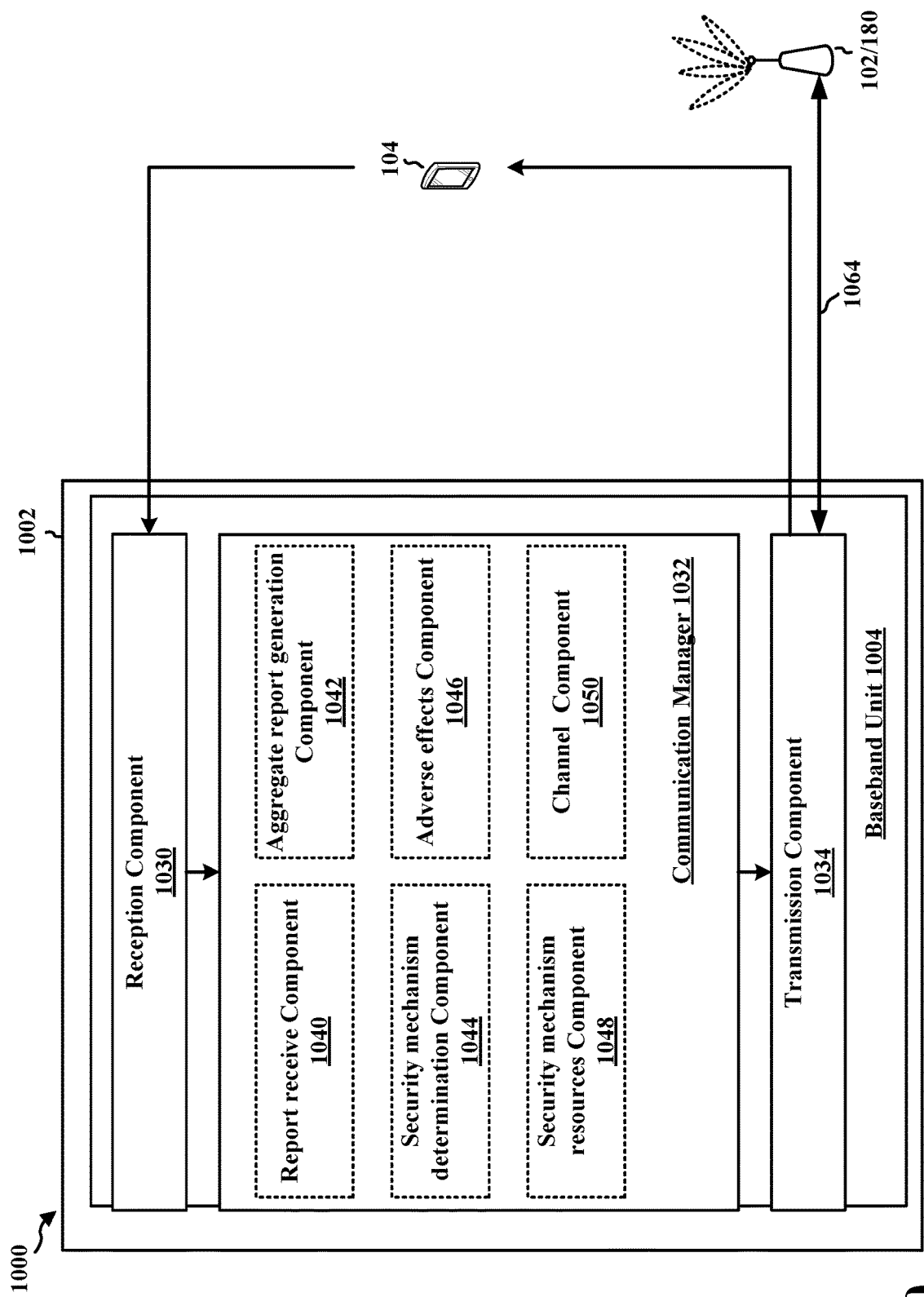
FIG. 10 is a diagram illustrating another example of a hardware implementation for another example apparatus, in accordance with various aspects of the present disclosure.

FIG. 8 is a flowchart of a method of wireless communication. The steps of FIG. 8 may be performed by the network or network entity, including in some cases the base station (in part or in whole), the core network 190 (FIG. 1), or any of the components of the core network, base station 310 (FIG. 3), network entity 405/505 (FIGS. 4 and 5), network entity 606 (FIG. 6), and apparatus 1002 (FIG. 10).

With initial reference to 802, the applicable network entity may receive a plurality of alert reports, each indicating a presence of an unauthorized network node and including information associated with the unauthorized network node, wherein the plurality of reports are respectively from a plurality of authorized network nodes. The network entity may aggregate this information and may transmit, according to 804 a message to one or more base stations, or in other configurations, to the UEs and other nodes of the network given its unique characteristics, indicating a security measure to be applied for communication between the authorized network nodes in response to the plurality of reports. As specified in 806, the security measure may be determined based on an adverse effect of the security measure on the authorized network nodes. Thus the network entity may choose a security measure that has a minimal adverse effect on the nodes. The nature of the threat may also be a consideration, in which case stronger, longer, or repeated measures may be part of the initially determined security measure.

In various configurations, such as at 808, the network entity may transmit another message indicating at least one of the authorized network nodes to communicate reports in an uplink direction, a downlink direction, or a sidelink direction, wherein the plurality of reports are received after the message is transmitted. As noted above with reference to FIG. 7, this flexibility may enable the network entity to avoid traffic-heavy or congested routes while capitalizing on less busy routes. This flexibility may also enable the network entity to reduce its energy use and the required interference that can result from transmitting data.

In another configuration, at 810, the network entity's transmission of the report may include transmitting an aggregated report including the information from each of the plurality of reports, wherein the aggregated report is transmitted over an authenticated link to at least one of the authorized network nodes. Thus, while a single report from one node may be insufficient to adequately inform the network of the nature of the threat, aggregated information from all adjacent or relevant operational nodes may be enough to allow the network entity to determine the most effective security measure under the circumstances, which may entail the authorized network nodes working in collaboration to flush out unauthorized nodes and prevent access to additional malicious nodes in the future.

At 812, the network entity may transmit another message indicating another security measure to be applied for communication between the authorized network nodes. This is in accord with FIG. 7, in which the UEs apply more than one security measure. In some cases for purposes of this disclosure, a security measure selected by the network may include a plurality of individual security measures of the same type or a different type, and which may be performed at a given time or over a longer time period, for example. Other advantages of this technique is that the network can achieve temporal continuity in protecting itself against malicious nodes. In other configurations, dynamic measures may be more appropriate such that the selected security measures can change with changing network conditions.

Figure 9:
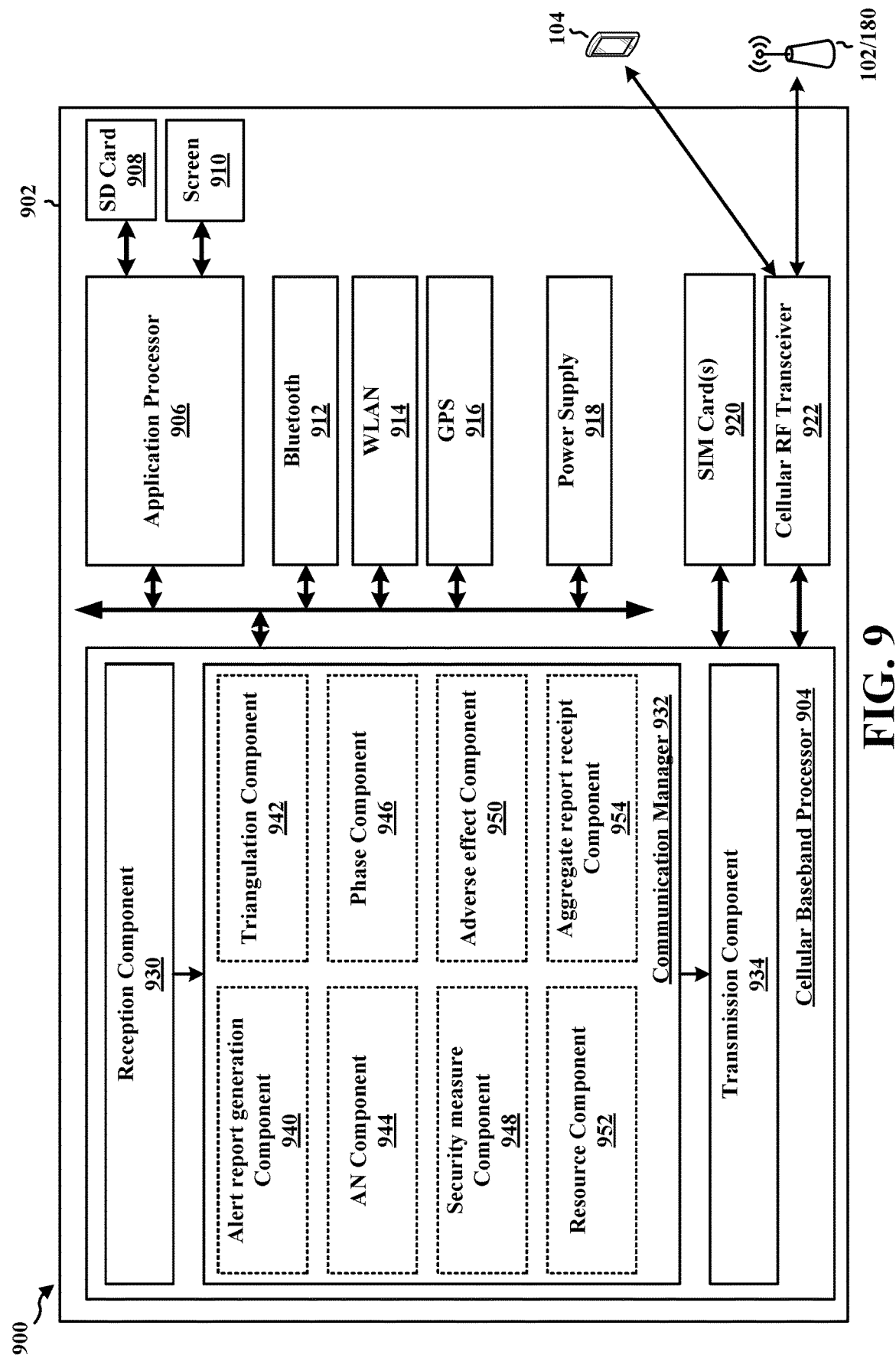
FIG. 9 is a diagram illustrating an example of a hardware implementation for an example apparatus, in accordance with various aspects of the present disclosure.

FIG. 9 is a diagram 900 illustrating an example of a hardware implementation for an apparatus 902. The apparatus in FIG. 9 may be descriptive (in part or in whole) of apparatus 104 in FIG. 1, UE 350 (FIG. 3), UEs 404.1 or 404.2 (FIG. 4) and 504.1 or 504.2 (FIG. 5), any of UEs 604.1-*n* (FIG. 6) and apparatus 902 (FIG. 9), for example. The apparatus 902 is a UE and includes a cellular baseband processor 904 (also referred to as a modem) coupled to a cellular RF transceiver 922 and one or more subscriber identity modules (SIM) cards 920, an application processor 906 coupled to a secure digital (SD) card 908 and a screen 910, a Bluetooth module 912, a wireless local area network (WLAN) module 914, a Global Positioning System (GPS) module 916, and a power supply 918. The cellular baseband processor 904 communicates through the cellular RF transceiver 922 with the UE 104 and/or BS 102/180. The cellular baseband processor 904 may include a computer-readable medium/memory. The computer-readable medium/memory may be non-transitory. The cellular baseband processor 904 is responsible for general processing, including the execution of software stored on the computer-readable medium/memory. The software, when executed by the cellular baseband processor 904, causes the cellular baseband processor 904 to perform the various functions described supra. The computer-readable medium/memory may also be used for storing data that is manipulated by the cellular baseband processor 904 when executing software. The cellular baseband processor 904 further includes a reception component 930, a communication manager 932, and a transmission component 934. The communication manager 932 includes the one or more illustrated components. The components within the communication manager 932 may be stored in the computer-readable medium/memory and/or configured as hardware within the cellular baseband processor 904. The cellular baseband processor 904 may be a component of the UE 350 and may include the memory 360 and/or at least one of the TX processor 368, the RX processor 356, and the controller/processor 359. In one configuration, the apparatus 902 may be a modem chip and include just the baseband processor 904, and in another configuration, the apparatus 902 may be the entire UE (e.g., see 350 of FIG. 3) and include the aforediscussed additional modules of the apparatus 902.

The communication manager 932 includes an Alert report generation component 940 that is configured to generate an alert report for that U.E. e.g., as described in connection with reference to the alert report transmitted in 702 of FIG. 7. The communication manager 932 further includes a triangulation component 942 that receives input in the form of coordinates of the malicious node from the reception component 930 and is configured to triangulate a position of a malicious node, e.g., as described in connection with information that may be included in the alert report described in 702. The communication manager 932 further includes an AN component 944 that receives input in the form of information from aggregate report receipt Component 950 and reception component 930 and is configured to decrypt AN noise from data in an authorized transmission, e.g., as described in connection with step 704 of FIG. 7 as an example security measure. The AN component 944 may also be configured to inject AN in a transmitted signal, if so determined by the aggregate alert report.

The communication manager 932 further includes a phase component 946 that receives information in the form of a security measure identified from Aggregate report receipt Component 954 and is configured to add a phase to a signal to encrypt the signal, for example. Thus components 944 and 946, together with security measure Component 948 which may take information regarding the security measure from Aggregate report receipt Component 954, may each assist in detecting an unauthorized node, as in 706 of FIG. 7. The communication manager 932 may further include adverse effect Component 950, which may take information from alert report generation Component 940 and which may use the information for insertion into the alert report identified in step 702. The communication manager 932 may further include a Resource Component 952, which may take into account one or more resources critical to the apparatus 902 for use in the Alert report generation Component 940 transmitted with reference to 702 in FIG. 7. As noted, the communication manager also includes Aggregate report receipt Component 954, which may store the received aggregate report from a network entity as in step 704 and from which various items of information about an unauthorized node may be taken, including the alert report transmitted in 702.

The apparatus may include additional components that perform each of the blocks of the algorithm in the aforementioned flowchart of FIG. 7. As such, each block in the aforementioned flowchart of FIG. 7 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

FIG. 10 is a diagram 1000 illustrating an example of a hardware implementation for an apparatus 1002. The apparatus 1002 is a network entity such as a core network or portion thereof, or a base station, and includes a baseband unit 1004. The baseband unit 1004 may communicate through a cellular RF transceiver with the UE 104. The baseband unit 1004 may include a computer-readable medium/memory. The baseband unit 1004 is responsible for general processing, including the execution of software stored on the computer-readable medium/memory. The software, when executed by the baseband unit 1004, causes the baseband unit 1004 to perform the various functions described supra. The computer-readable medium/memory may also be used for storing data that is manipulated by the baseband unit 1004 when executing software. The baseband unit 1004 further includes a reception component 1030, a communication manager 1032, and a transmission component 1034. The communication manager 1032 includes the one or more illustrated components. The components within the communication manager 1032 may be stored in the computer-readable medium/memory and/or configured as hardware within the baseband unit 1004. The baseband unit 1004 may be a component of the base station 310 and may include the memory 376 and/or at least one of the TX processor 316, the RX processor 370, and the controller/processor 375.

The communication manager 1032 includes a Report receive component 1040 that is configured to receive messages including alert reports from nodes in the network, e.g., as described in connection with 802 in FIG. 8. The communication manager 1032 further includes an Aggregate report generation Component 1042 that receives information from the different reports in report receive Component 1040 for determining and transmitting a security measure, e.g., as described in connection with 804 in FIG. 8. The communication manager 1032 further includes a Security mechanism determination Component 1044 that receives information in the form of adverse effects from the alert reports in Component 1040 and for taking the adverse effects of different nodes into account in determining the security measure, e.g., as described in connection with 806 of FIG. 8. The communication manager 1032 further includes an Adverse effects Component 1046 that is configured to store information regarding adverse effects of the network entity and the different nodes for use in generating and transmitting the aggregate report and determining the security measure, as in 804, 806 and 812 of FIG. 8.

The communication manager 1032 further includes a Security mechanism resources Component 1048, that takes information about network resources and adverse effects from Components 1040 and 1046 and determines the security measure by taking those features into account, as in 802, 804 and 806 of FIG. 8. The communication manager also includes a Channel Component 1050 that is configured to take information about network resources and adverse effects from Components 1040 and 1046 and is configured to determine a channel in which to transmit an aggregate alert report or to instruct nodes to transmit their respective reports, as in 808 of FIG. 8.

The apparatus may include additional components that perform each of the blocks of the algorithm in the aforementioned flowcharts of FIG. 8. As such, each block in the aforementioned flowchart of FIG. 8 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following examples are illustrative only and may be combined with aspects of other embodiments or teachings described herein, without limitation.

Example 1 is an apparatus for wireless communication at a user equipment, comprising: a memory; and at least one processor coupled to the memory and configured to: transmit a report indicating a presence of an unauthorized network node, the report including information associated with the unauthorized network node; and receive a message indicating a security measure to be applied for communications between authorized network nodes including the UE, the message being received in response to the report and in response to another report from one of the authorized network nodes, the another report including further information associated with the unauthorized network node.

Example 2 is the apparatus of example 1, wherein the at least one processor is further configured to detect the presence of the unauthorized network node in response to a different security measure.

Example 3 is the apparatus of any of Examples 1 and 2, wherein the security measure is based on an adverse effect of the security measure on the authorized network nodes.

Example 4 is the apparatus of any of Examples 1 to 3, wherein the adverse effect relates to a current topology of the authorized network nodes, an activity of at least one of the authorized network nodes, or a capability of the at least one of the authorized network nodes.

Example 5 is the apparatus of any of Examples 1 to 4, wherein the message indicates a resource in which the security measure is to be applied, wherein the resource is based on the information associated with the unauthorized network node.

Example 6 is the apparatus of any of Examples 1 to 5, wherein the resource is a time slot, at least one frequency band, or a beam.

Example 7 is the apparatus of any of Examples 1 to 6, wherein the at least one processor is further configured to receive another message indicating the UE to communicate reports in an uplink direction, a downlink direction, or a sidelink direction, wherein the report is transmitted after the another message is received.

Example 8 is the apparatus of any of Examples 1 to 7, wherein the at least one processor is further configured to receive an aggregated report including the information from the report and the further information from the another report, wherein the aggregated report is received over an authenticated link with at least one of the authorized network nodes.

Example 9 is the apparatus of any of Examples 1 to 8, wherein the aggregated report indicates a location of the unauthorized network node, the location being based on the information from the report and the further information from the another report.

Example 10 is the apparatus of any of Examples 1 to 9, wherein the aggregated report includes the message indicating the security measure.

Example 11 is the apparatus of any of Examples 1 to 10, wherein the security measure is a physical layer security measure or a cross-layer security measure.

Example 12 is the apparatus of any of Examples 1 to 11, wherein the at least one processor is further configured to: receive another message indicating another security measure to be applied for communication between the authorized network nodes; and detect the presence of the unauthorized network node based on the another security measure in response to the another message.

Example 13 is the apparatus of any of Examples 1 to 12, wherein the another message is received periodically or aperiodically.

Example 14 is an apparatus for wireless communications at a network entity, comprising a memory; and at least one processor coupled to the memory and configured to: receive a plurality of reports each indicating a presence of an unauthorized network node and including information associated with the unauthorized network node, wherein the plurality of reports are respectively from a plurality of authorized network nodes; and transmit a message indicating a security measure to be applied for communication between the authorized network nodes in response to the plurality of reports.

Example 15 is the apparatus of Example 14, wherein the at least one processor is further configured to determine the security measure based on an adverse effect of the security measure on the authorized network nodes.

Example 16 is the apparatus of any of Examples 14 and 15, wherein the adverse effect relates to a current topology of the authorized network nodes, an activity of at least one of the authorized network nodes, or a capability of the at least one of the authorized network nodes.

Example 17 is the apparatus of any of Examples 14 to 16, wherein the message indicates a resource in which the security measure is to be applied, wherein the resource is based on the information associated with the unauthorized network node.

Example 18 is the apparatus of any of Examples 14 to 17, wherein the resource is a time slot, at least one frequency band, or a beam.

Example 19 is the apparatus of any of Examples 14 to 18, wherein the at least one processor is further configured to transmit another message indicating at least one of the authorized network nodes to communicate reports in an uplink direction, a downlink direction, or a sidelink direction, wherein the plurality of reports are received after the message is transmitted.

Example 20 is the apparatus of any of Examples 14 to 19, wherein the at least one processor is further configured to transmit an aggregated report including the information from each of the plurality of reports, wherein the aggregated report is transmitted over an authenticated link to at least one of the authorized network nodes.

Example 21 is the apparatus of any of Examples 14 to 20, wherein the aggregated report indicates a location of the unauthorized network node, the location being based on the information from each of the plurality of reports.

Example 22 is the apparatus of any of Examples 14 to 21, wherein the aggregated report includes the message indicating the security measure.

Example 23 is the apparatus of any of Examples 14 to 22, wherein the security measure is a physical layer security measure or a cross-layer security measure.

Example 24 is the apparatus of any of Examples 14 to 23, wherein the at least one processor is further configured to transmit another message indicating another security measure to be applied for communication between the authorized network nodes; wherein the plurality of reports are received in response to a detection of the presence of the unauthorized network node based on the another security measure.

Example 25 is the apparatus of any of Examples 14 to 24, wherein the another message is transmitted periodically or aperiodically.

Example 26 is a method for wireless communication at a user equipment (UE), comprising: transmitting a report indicating a presence of an unauthorized network node, the report including information associated with the unauthorized network node; and receiving a message indicating a security measure to be applied for communications between authorized network nodes including the UE, the message being received in response to the report and in response to another report from one of the authorized network nodes, the another report including further information associated with the unauthorized network node.

Example 27 is the method of Example 26, further comprising: detecting the presence of the unauthorized network node in response to a different security measure.

Example 28 is the method of any of Examples 26 and 27, wherein the security measure is based on an adverse effect of the security measure on the authorized network nodes.

Example 29 is a method for wireless communication at a network entity, comprising: receiving a plurality of reports each indicating a presence of an unauthorized network node and including information associated with the unauthorized network node, wherein the plurality of reports are respectively from a plurality of authorized network nodes; and transmitting a message indicating a security measure to be applied for communication between the authorized network nodes in response to the plurality of reports.

Example 30 is the method of Example 29, further comprising: determining the security measure based on an adverse effect of the security measure on the authorized network nodes.

What is claimed is:

1. An apparatus for wireless communication at a user equipment (UE), comprising:
   a transceiver;
   a memory; and
   at least one processor coupled to the memory and to the transceiver, the at least one processor configured to:
     transmit, via the transceiver, a first report indicating a presence of an unauthorized network node, the first report including information associated with the unauthorized network node, and
     receive, via the transceiver, a first message indicating a first security measure to be applied for communications between authorized network nodes including the UE, the first message based on the first report and a second report from one of the authorized network nodes, the second report including further information associated with the unauthorized network node, and the first security measure being one of: a re-authentication process of the UE, a scrambling sequence, an upper-layer encryption algorithm, or a false physical (PHY) layer signature.

2. The apparatus of claim 1, wherein the at least one processor is further configured to:
   detect the presence of the unauthorized network node based on a second security measure different from the first security measure, the second security measure being one of: the re-authentication process of the UE, the scrambling sequence, the upper-layer encryption algorithm, or the false physical (PHY) layer signature.

3. The apparatus of claim 1, wherein the first security measure is based on an adverse effect the first security measure has on communications between the authorized network nodes.

4. The apparatus of claim 3, wherein the adverse effect relates to a current topology of the authorized network nodes, an activity of at least one of the authorized network nodes, or a capability of at least one of the authorized network nodes.

5. The apparatus of claim 1, wherein the first message indicates a resource in which the first security measure is to be applied, wherein the resource is based on the information associated with the unauthorized network node.

6. The apparatus of claim 5, wherein the resource is a time slot, at least one frequency band, or a beam.

7. The apparatus of claim 1, wherein the at least one processor is further configured to:
receive, via the transceiver, a second message indicating the UE to communicate reports in an uplink direction, a downlink direction, or a sidelink direction, wherein the first report is transmitted after the second message is received.

8. The apparatus of claim 1, wherein the at least one processor is further configured to:
receive, via the transceiver, an aggregated report including the information from the first report and the further information from the second report, wherein the aggregated report is received over an authenticated link with at least one of the authorized network nodes.

9. The apparatus of claim 8, wherein the aggregated report indicates a location of the unauthorized network node, the location being based on the information from the first report and the further information from the second report.

10. The apparatus of claim 8, wherein the aggregated report includes the first message indicating the first security measure.

11. The apparatus of claim 1, wherein the first security measure is further associated with a cross-layer security measure.

12. The apparatus of claim 1, wherein the at least one processor is further configured to:
receive, via the transceiver, a second message indicating a second security measure to be applied for communication between the authorized network nodes; and
detect the presence of the unauthorized network node based on the second security measure based on the second message.

13. The apparatus of claim 12, wherein the second message is received periodically or aperiodically.

14. An apparatus for wireless communication at a network entity, comprising:
a transceiver;
a memory; and
at least one processor coupled to the memory and to the transceiver, the at least one processor configured to:
receive, via the transceiver, a plurality of reports each indicating a presence of an unauthorized network node and including information associated with the unauthorized network node, wherein the plurality of reports are respectively from a plurality of authorized network nodes, and
transmit, via the transceiver, a first message indicating a first security measure to be applied for communication between the plurality of authorized network nodes based on the plurality of reports, the first security measure being one of: a re-authentication process of a network node, a scrambling sequence, an upper-layer encryption algorithm, or a false physical (PHY) layer signature.

15. The apparatus of claim 14, wherein the at least one processor is further configured to:
determine the first security measure based on an adverse effect the first security measure has on communications between the plurality of authorized network nodes.

16. The apparatus of claim 15, wherein the adverse effect relates to a current topology of the plurality of authorized network nodes, an activity of at least one of the plurality of authorized network nodes, or a capability of at least one of the plurality of authorized network nodes.

17. The apparatus of claim 14, wherein the first message indicates a resource in which the first security measure is to be applied, wherein the resource is based on the information associated with the unauthorized network node.

18. The apparatus of claim 17, wherein the resource is a time slot, at least one frequency band, or a beam.

19. The apparatus of claim 14, wherein the at least one processor is further configured to:
transmit, via the transceiver, a second message indicating at least one of the plurality of authorized network nodes to communicate reports in an uplink direction, a downlink direction, or a sidelink direction, wherein the plurality of reports are received after the first message is transmitted.

20. The apparatus of claim 14, wherein the at least one processor is further configured to:
transmit, via the transceiver, an aggregated report including the information from each of the plurality of reports, wherein the aggregated report is transmitted over an authenticated link to at least one of the plurality of authorized network nodes.

21. The apparatus of claim 20, wherein the aggregated report indicates a location of the unauthorized network node, the location being based on the information from each of the plurality of reports.

22. The apparatus of claim 20, wherein the aggregated report includes the first message indicating the first security measure.

23. The apparatus of claim 14, wherein the first security measure is further associated with a cross-layer security measure.

24. The apparatus of claim 14, wherein the at least one processor is further configured to:
transmit, via the transceiver, a second message indicating a second security measure to be applied for communication between the plurality of authorized network nodes, wherein the plurality of reports are received based on a detection of the presence of the unauthorized network node based on the second security measure.

25. The apparatus of claim 24, wherein the second message is transmitted periodically or aperiodically.

26. A method of wireless communication performed by a user equipment (UE), the method comprising:
transmitting a first report indicating a presence of an unauthorized network node, the first report including information associated with the unauthorized network node; and
receiving a message indicating a first security measure to be applied for communications between plurality of authorized network nodes including the UE, the message being received based on the first report and a second report from one of the plurality of authorized network nodes, the second report including further information associated with the unauthorized network node, and the first security measure being one of: a re-authentication process of the UE, a scrambling sequence, an upper-layer encryption algorithm, or a false physical (PHY) layer signature.

27. The method of claim 26, further comprising:
detecting the presence of the unauthorized network node based on a second security measure different from the first security measure, the second security measure being one of: the re-authentication process of the UE, the scrambling sequence, the upper-layer encryption algorithm, or the false physical (PHY) layer signature.

28. The method of claim 26, wherein the first security measure is based on an adverse effect the first security measure has on communications between the plurality of authorized network nodes.

29. A method of wireless communication performed by a network entity, the method comprising:
- receiving a plurality of reports each indicating a presence of an unauthorized network node and including information associated with the unauthorized network node, wherein the plurality of reports are respectively from a plurality of authorized network nodes; and
- transmitting a message indicating a security measure to be applied for communication between the plurality of authorized network nodes based on the plurality of reports, the security measure being one of: a re-authentication process of a network node, a scrambling sequence, an upper-layer encryption algorithm, or a false physical (PHY) layer signature.

30. The method of claim 29, further comprising:
- determining the security measure based on an adverse effect the security measure has on communications between the plurality of authorized network nodes.

\* \* \* \* \*